(12) United States Patent
Chance (10) Patent No.: US 10,612,636 B2
(45) Date of Patent: Apr. 7, 2020

(54) HYDRAULIC TORQUE CONVERTER

(71) Applicant: Martin W. Chance, Cheney, KS (US)

(72) Inventor: Martin W. Chance, Cheney, KS (US)

(*) Notice: Subject to any disclaimer, the term of this patent is extended or adjusted under 35 U.S.C. 154(b) by 0 days.

(21) Appl. No.: 15/909,724

(22) Filed: Mar. 1, 2018

(65) Prior Publication Data
US 2018/0187761 A1 Jul. 5, 2018

(51) Int. Cl.
*F16H 45/02* (2006.01)
*F16D 25/0635* (2006.01)

(52) U.S. Cl.
CPC ......... *F16H 45/02* (2013.01); *F16D 25/0635* (2013.01); *F16H 2045/0205* (2013.01); *F16H 2045/0278* (2013.01)

(58) Field of Classification Search
CPC ......... F16H 45/022045; F16H 45/0278; F16D 25/0635
See application file for complete search history.

(56) References Cited

U.S. PATENT DOCUMENTS

| | | | |
|---|---|---|---|
| 2004/0139743 A1* | 7/2004 | Sato | F16D 41/066 60/345 |
| 2014/0008174 A1* | 1/2014 | Tomiyama | F16H 45/02 192/203 |
| 2018/0163815 A1* | 6/2018 | Tomiyama | F16F 15/31 |

* cited by examiner

*Primary Examiner* — Huan Le
(74) *Attorney, Agent, or Firm* — Kenneth H. Jack; Davis & Jack, L.L.C.

(57) ABSTRACT

A torque converter incorporating a case having a rotation axis; an impeller within the case, the impeller being mounted for co-rotation with the case; a turbine mounted within the case for rotation with respect to the case; radially inner and outer walls within the case, the walls defining an annulus having axial and oppositely-axial ends, the walls being mounted for co-rotation with the case or the walls being mounted for co-rotation with the turbine; a piston slidably received within the annulus; a plurality of race and roller combinations mounted at the annulus's oppositely axial end, the race and roller combinations being adapted for centrifugally driving and for axially pressing their rollers against the piston; and a friction surface within the case, the friction surface being positioned for, upon the axial pressings of the rollers against the piston, frictionally engaging and resisting rotation of the piston.

13 Claims, 9 Drawing Sheets

HYDRAULIC TORQUE CONVERTER

FIELD OF THE INVENTION

This invention relates to rotary power transmission linkages for translating rotary power from an engine's rotary power output to a transmission's rotary power input. More particularly, this invention relates to hydraulic torque converters which are adapted for serving as such rotary power translating linkage.

BACKGROUND OF THE INVENTION

Hydraulic torque converters are known to be provided and utilized as a rotary torque communicating linkage between the rotary power output of an engine and the rotary power input of the engine's transmission. Such torque converters commonly comprise a rotatable hollow case which defines an interior power transfer space. Typically, such space is toroidal and is filled with pressurized hydraulic fluid. The case component of such converters is typically rigidly mounted to an engine's power output shaft or flywheel for 1:1 co-rotation of the case with the engine's crankshaft.

A radial array of impeller blades or vanes is commonly rigidly mounted to the case within the case's toroidal interior fluid filled space, such blades co-rotating with both the case and the engine's rotary output.

A turbine is typically rotatably mounted within the case, the turbine having an array of consistently pitched or angled blades or vanes which face the impeller blades. The turbine's rotary power output commonly comprises a transmission input shaft which emerges from the case through an axially aligned power output port. The annular seam or annulus between the turbine's output shaft and the inner periphery of such port is typically hermetically sealed for retention of pressurized fluid within the case.

In operation of such torque converters, engine power directly rotates the case and its co-rotating impeller blades. Fluid driven by the impeller blades impinges against turbine blades which are positioned immediately downstream from the impeller, such impingement rotating the turbine. The resultant turbine rotation rotates the turbine's power output shaft or socket linkage with a transmission's power input shaft. A mechanical linkage of the turbine to the transmission's rotary power input advantageously allows rotary torque from the engine to translate to the transmission exclusively hydro-dynamically via the pressurized fluid encased within the torque converter.

While such common hydraulic torque converters beneficially and advantageously allow for a very large differential between the rotational speeds of the impeller/case and the turbine during engine powered acceleration, such torque converters disadvantageously and undesirably assure that the turbine will not reach 100% of the rotation speed of the impeller/case. Such rotational differential results in mechanical inefficiencies during cruising operation of the engine and transmission.

To minimize such mechanical inefficiencies, fluid pressure actuated rotary clutches are known to be introduced into hydraulic torque converters, such clutches being selectively actuatable to provide a frictional 1:1 rotation linkage between the case/impeller and the turbine. However, such known fluid pressure actuated clutches typically undesirably require incorporation and installation additional complicated and expensive equipment. Such equipment may, for example, be adapted to transmit pressurized hydraulic fluid from the transmission into the torque converter for selective actuation of an interior hydraulic clutch. Such known clutch actuation assemblies often additionally require expensive rotation speed sensing and valve actuation equipment for actuating and de-actuating the hydraulic clutch at appropriate turbine rotational speeds.

In such known torque converter clutch assemblies, the ambient fluid pressure within the torque converter's toroidal interior space is typically utilized as the motive force for the stroke of a clutch actuating hydraulic piston (such stroke being either clutch engaging or clutch disengaging motion). Also, in such known assemblies, the motive force for oppositely driving or drawing the counter-stroke of such piston similarly constitutes fluid pressure pumped into or aspirated from a void at the opposite side of the clutch piston. The instant inventive hydraulic torque converter solves or ameliorates the above discussed hydraulic torque converter problems and difficulties by eliminating such fluid pumping and counter-stroke impelling equipment and structures, and by replacing such equipment with rollers and other specialized structures which enable the rollers to impel a clutch engaging piston counter-stroke, without any requirement of pumping fluids into or out the space underlying the piston.

BRIEF SUMMARY OF THE INVENTION

A first structural component of the instant inventive torque converter comprises a hollow case which is attachable to and rotatable by an engine's rotary power output, and which defines an interior hydraulic fluid space. In a preferred embodiment, the interior space of the case is toroidal, and the case has axial and oppositely-axial halves which are releasably joined at a hermetic annular seal. In the preferred embodiment, the case has an axis of rotation and the case is ported in alignment with the axis for communication of an engine transmission's rotary power input shaft with structures mounted and supported within the case, as described below.

A further structural component of the instant inventive torque converter comprises a multiply bladed or vaned fluid impeller which is mounted and supported within the case for co-rotation or 1:1 rotation with respect to the case.

In the preferred embodiment, the vanes of the impeller are angled for driving pressurized hydraulic fluid contained within the case both circumferentially and in a direction parallel to the rotation axis of the case.

A further structural component of the instant inventive torque converter comprises a turbine which is rotatably mounted within the case for consistent and independent rotation with respect to the case and with impeller blades. In the preferred embodiment, the turbine's vanes or blades are pitched consistently with respect to the pitch of the impeller blades so that fluid impelled by the impeller blades impinges against the turbine blades to turn the turbine in the same direction as the co-rotation of the case and impeller.

Further structural components of the instant inventive torque converter comprise an annularly extending radially inner wall and an annular extending radially outer wall. Such walls are mounted and supported within the interior space of the case and, in the preferred embodiment, the radially inner and outer wall components define and bound a piston receiving annulus which has axial and oppositely-axial ends.

In a preferred embodiment of the instant invention, the radially inner and outer annulus defining walls are mounted for co-rotating or 1:1 rotation with respect to the co-rotating case and impeller blades. Suitably, such radially inner and outer walls may be alternatively mounted for co-rotating or 1:1 rotation with respect to the turbine component.

A further structural component of the instant inventive torque converter comprises a piston which is ring configured to closely fit the periphery geometry of the annulus, such piston being slidably received within the annulus. In the preferred embodiment, the piston component has radially inner and radially outer ends which are respectively closely fitted to the annulus's annular radially inner and radially outer walls. Radially inner and radially outer annular pressure seals or ring seals are preferably provided for hermetically circumferentially sealing the piston with respect to the annulus at the piston's two annular junctures. Consistently with the axial and oppositely-axial ends of the annulus, the piston has axial and oppositely-axial ends. For purposes of consistent understanding of structural orientation herein, the end of the piston which reciprocatingly moves parallel to the case's rotation axis and into and out of engagement with a friction surface or clutching surface (as further described below) is to be understood as the piston's axial end.

Further structural components of the instant inventive torque converter comprise a plurality of race and roller combinations. In the preferred embodiment, such combinations are mounted at the annulus's oppositely axial end. Said combinations are preferably adapted for centrifugally driving their rollers in radially outward directions and for simultaneously axially pressing their rollers against the oppositely-axial end of the piston. In a preferred embodiment such adaptations comprise configurations of race floors and/or ceilings which choke the axial dimensions of the radially outward ends of the races. Such chokes constitute structural components of the invention which establish axial inside dimensions which are less than the rollers' diameters.

The race choke components of the instant invention assure that, upon centrifugal driving of the rollers toward their radially outwardly displaced positions, the rollers brace and wedge between the oppositely-axial floors of the races and the races' ceilings which are formed by the oppositely-axial end of the piston. Such choking of the roller races allows the rollers to advantageously centrifugally drive the piston along the annulus toward the annulus's axial end and into a clutching engagement for equalizing the speed of the turbine with that of the case.

A further structural component of the instant inventive torque converter comprises a preferably annular friction or clutching surface. The friction surface component of the invention is mounted and supported within or exposed within the case, and such surface is preferably positioned for, upon the above described axial pressing of the rollers against the piston's oppositely-axial face, coming into frictional contact with the axial end of the piston.

The piston is preferably fixed for 1:1 co-rotation with the annulus and, where the annulus is mounted and supported for co-rotation with the case and the impeller blades, the friction surface component preferably is mounted to and co-rotates with the turbine. Alternatively, where the annulus and piston co-rotate with the turbine, the invention's friction surface component is preferably mounted to and co-rotates with the case.

In operation of the instant inventive torque converter, the choke forming slope angles of the floors and/or ceilings of the races and the mass of the rollers are selected so that centrifugal and axial driving of the piston toward the friction surface occurs at an appropriate rotational speed for clutch lock-up within the torque converter. Such speed will typically occur when the rotation speed of the turbine rises to between 90%-95% of the rotation speed of the case and impeller blades.

Accordingly, the instant inventive torque converter advantageously automatically rotationally links the case and impeller components with the turbine component at an appropriate rotational speed. The races are preferably radially oblongated to allow different numbers of rollers to be selectively inserted as means for adjusting roller mass.

Accordingly, objects of the instant invention include the provision of a hydraulic torque converter which incorporates structures, as described above, and which arranges those structures in relation to each other in manners described above, for the achievement of beneficial functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
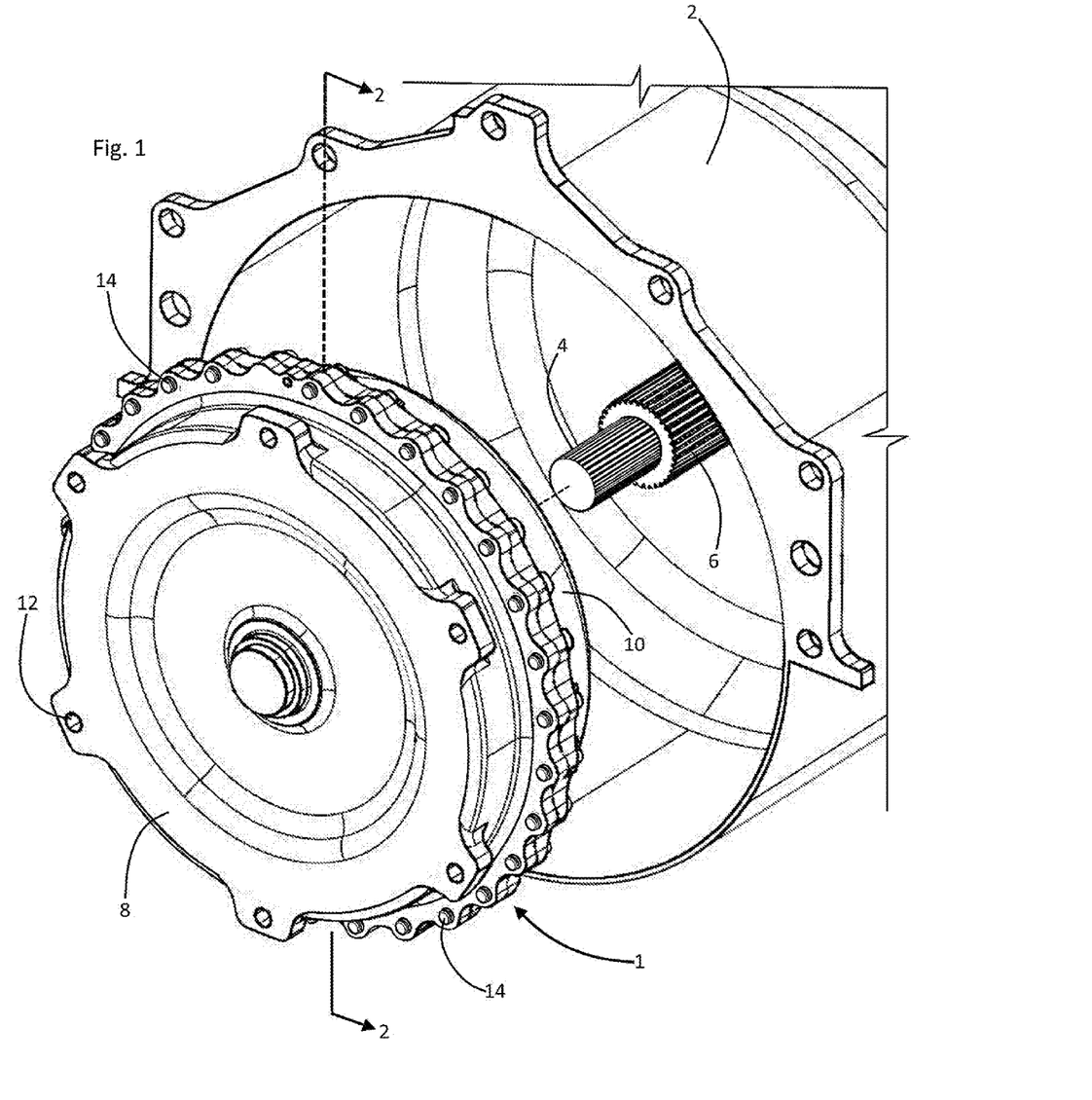
FIG. 1 includes a perspective view of the instant inventive hydraulic torque converter, the view showing an engine transmission aligned for engagement with the torque converter.
Figure 2:
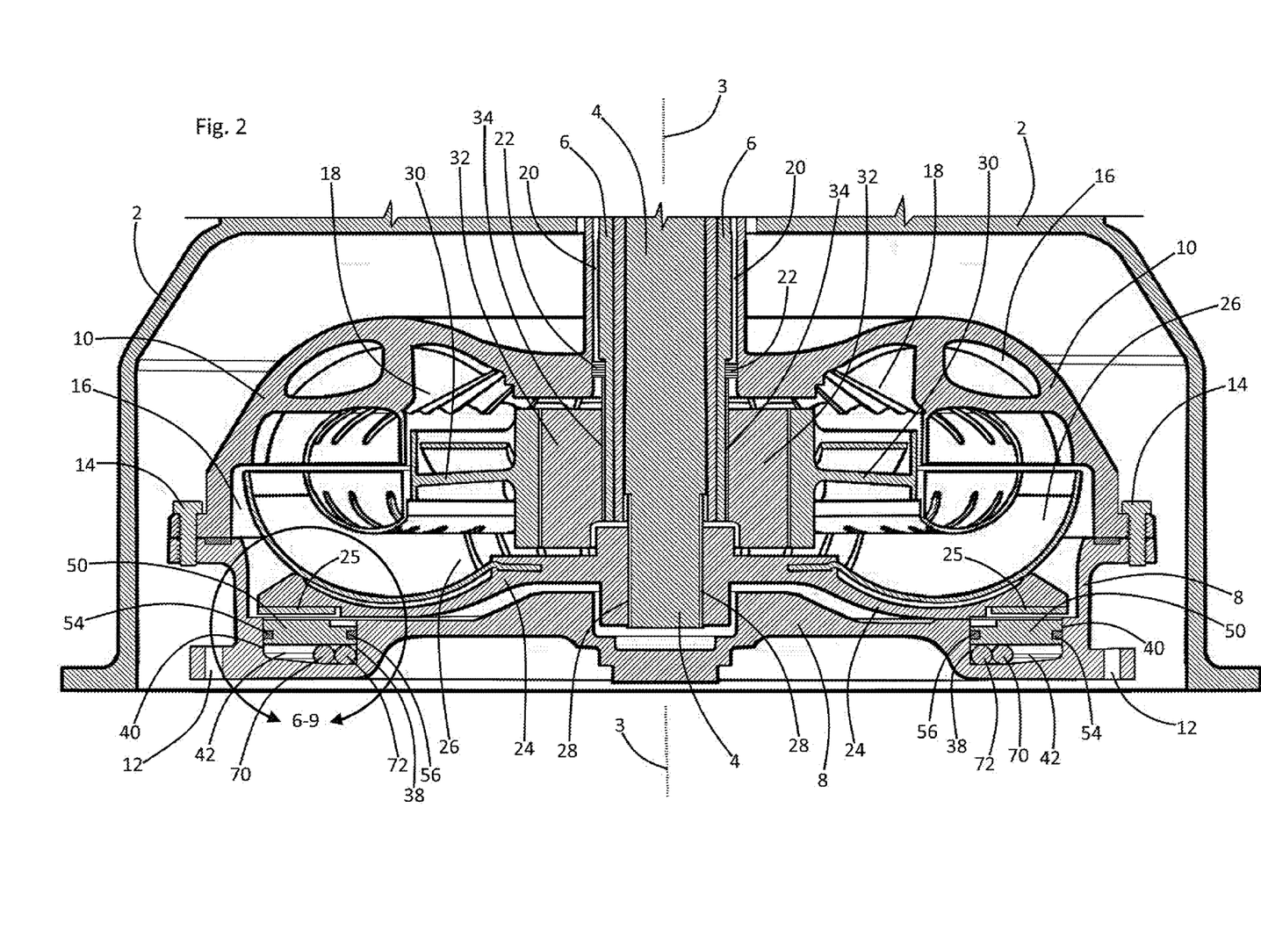
FIG. 2 is a sectional view as indicated in FIG. 1.
Figure 3:
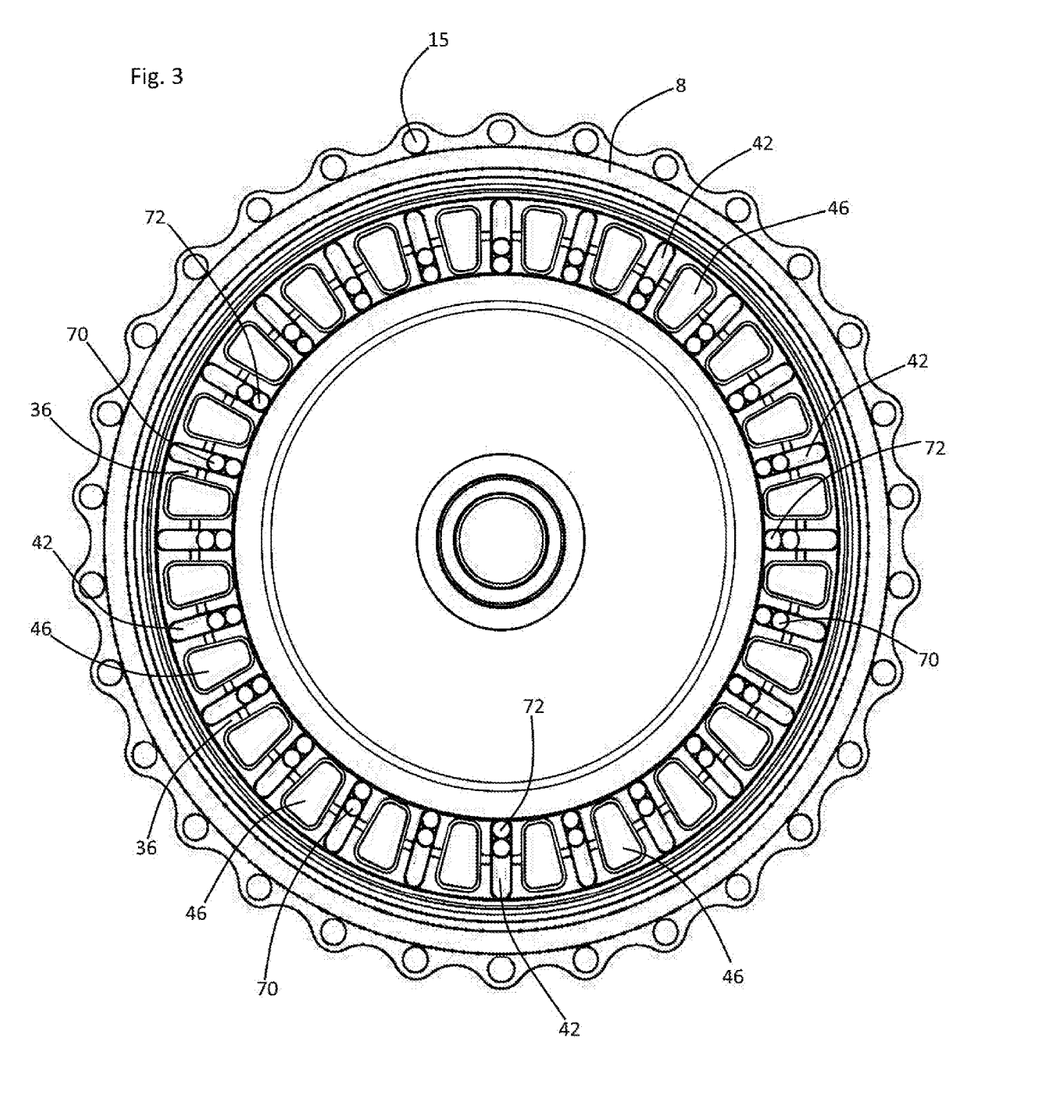
FIG. 3 is a plan view of a half of the instant inventive torque converter.

Referring now to the drawings and in particular to Drawing FIGS. 1-3, a preferred embodiment of the instant inventive hydraulic torque converter is referred to generally by Reference Arrow 1. The torque converter 1 has case including case halves 8 and 10, such halves being securely and hermetically interconnected by threaded bolts 14 extending through bolt receiving eyes 15. The case halves 8 and 10 define and enclose a toroidally shaped hydraulic fluid filled space 16. The case 1 has a rotation axis 3, and has a sleeve defined power output opening 20 positioned in concentric alignment with such axis.

An impeller 18 comprising a radial array of fluid driving vanes is attached to or formed wholly with case half 8 so that the impeller 18 co-rotates with the case 1. Engine mounts 12 are provided upon case half 8 and, upon attachment of mounts 12 to an engine's rotary output, and upon powered rotation of the case 1 by such engine, the internal impeller 18 drives the hydraulic fluid within volume 16 in circumferential and parallel directions with respect to axis 3.

A turbine 24 having a radial array of consistently pitched vanes or blades 26 is mounted rotatably within space 16.

Hydraulic fluid, which is driven circumferentially within space 16 and toward turbine 24 by the impeller blades 18, impinges against turbine blades 24 for rotationally driving the turbine 24 in the same direction as the rotation of the case 8,10. Such rotation may translate to a central input shaft 4 of an engine transmission 2 via a keyed juncture 28 as the vanes 26 of the turbine 24 translate rotational motion of the case 8,10 and the impeller blades 18 into rotary motions of the turbine 24 and the transmission shaft 4.

During engine acceleration, the driven hydraulic fluid which re-circulates past vanes 26 toward impeller 18 tends to move in a counter-rotational direction. To reduce inefficiencies resulting from such induced counter-rotational hydraulic fluid flow, a pass through stator 30 having a one way or uni-directional rotation clutch 32 is centrally mounted within space 16 for engagement with the outer transmission rotary power input 6 at keyed juncture 34. While such counter-rotational flow exists, the stator 30 conditions the return flow into a substantially axially directed flow, and upon a rotational transition of such flow, clutch 34 allows the return flow to compliment the torque converter's rotary power transfer. A rotation facilitating hydraulic seal 22 maintains hydraulic fluid pressure within space 16 while shafts 4 and 6 rotate with respect to the case 8,10.

Figure 5:
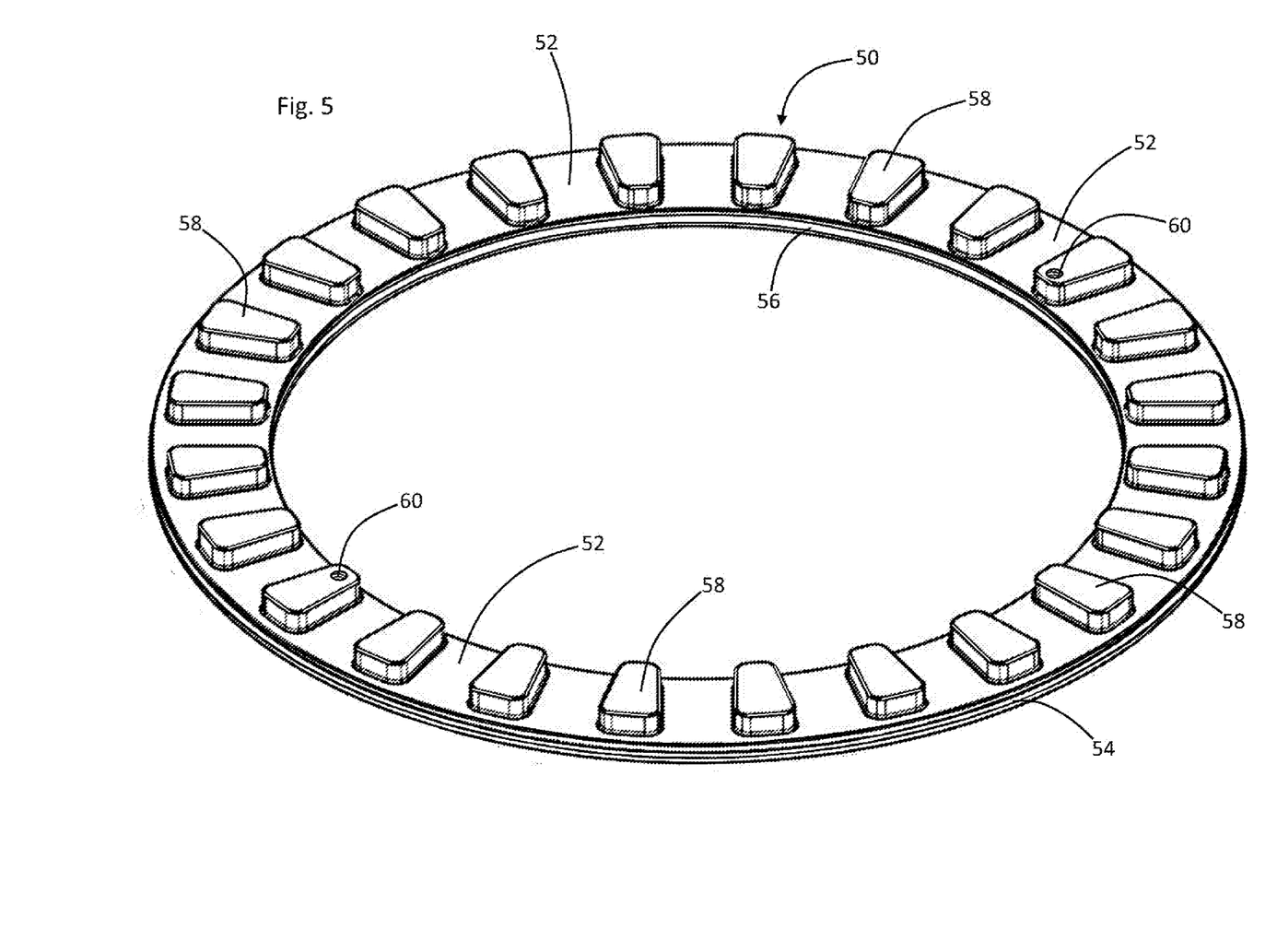
FIG. 5 is a perspective view of the ring configured piston component, such component's oppositely axial end being exposed to view.
Figure 6:
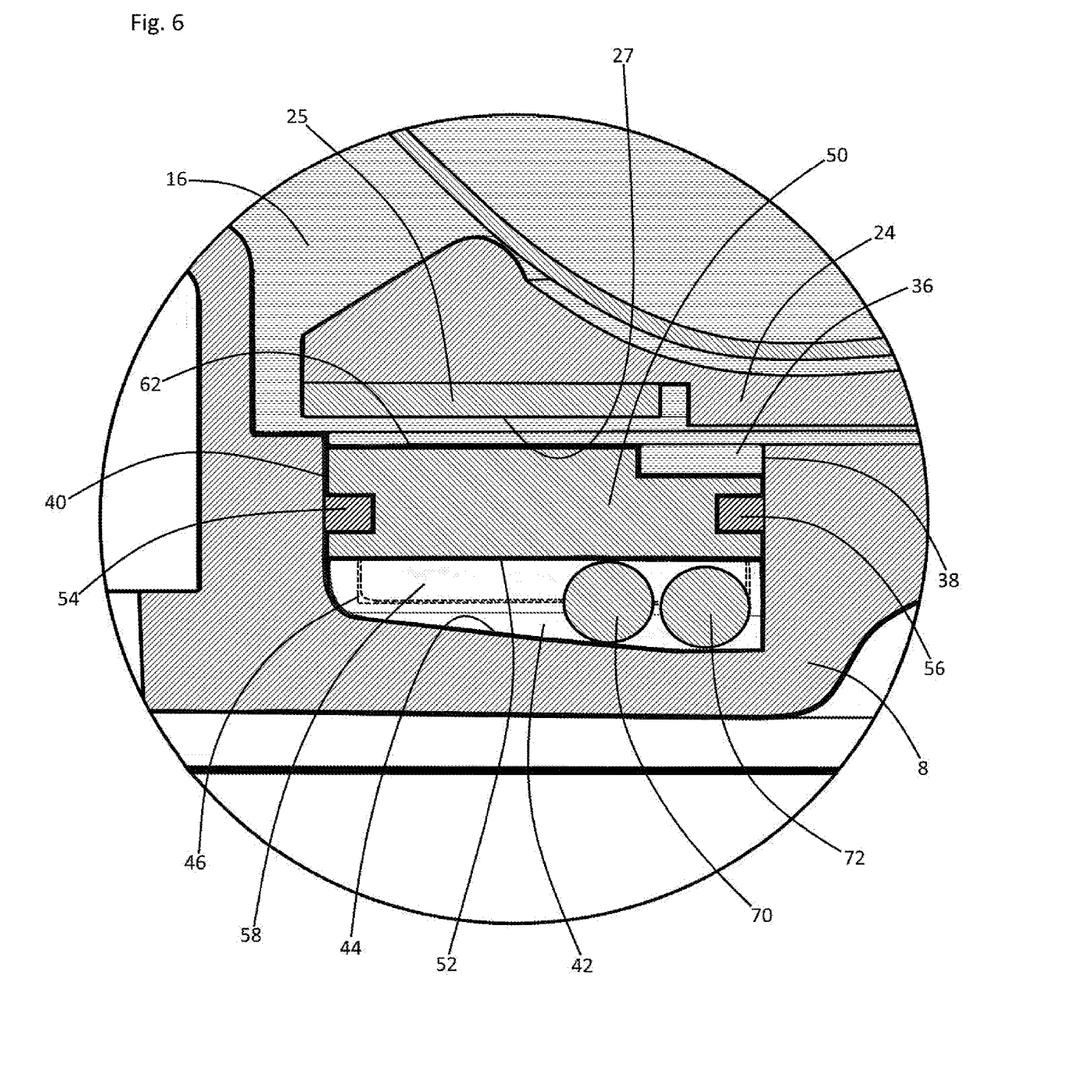
FIG. 6 is a magnified partial view, as indicated in FIG. 2.

Referring simultaneously to FIGS. 2, 5, and 6, the instant inventive torque converter preferably further comprises an annular radially inner wall 38 and an annular radially outer wall 40, such walls necessarily being supported and housed within the case 8,10. Such walls 38 and 40 advantageously form and define a piston receiving annulus 36. The invention's annular walls 38 and 40 and the interstitial annulus 36 are suitably mounted for 1:1 co-rotation with the case 8,10, and with the case's impellers 18. Suitably and alternatively, the invention's annulus and annulus forming walls may be alternatively mounted as shown in FIG. 8 for co-rotation with the invention's turbine component.

Figure 7:
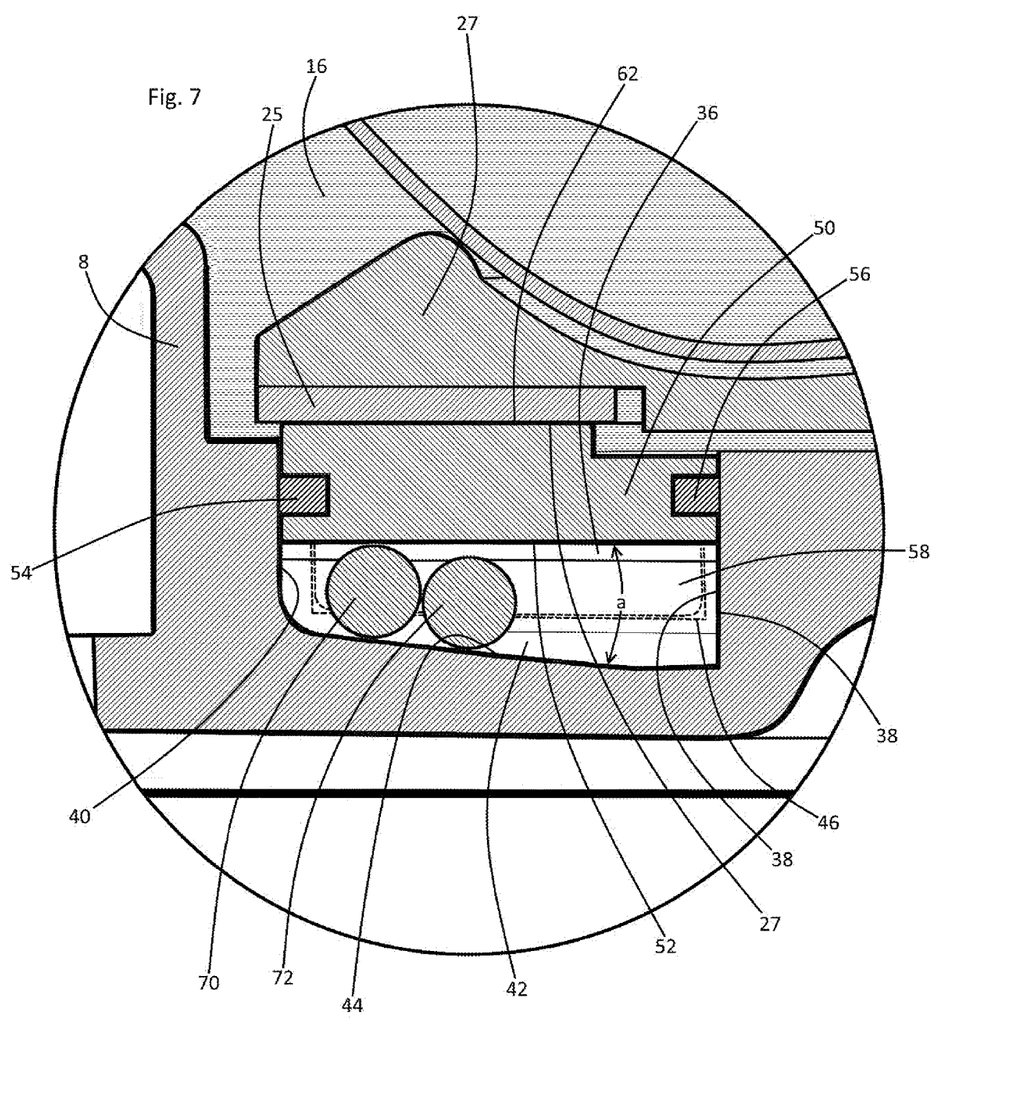
FIG. 7 redepicts the structure of FIG. 6, the view of FIG. 7 showing the piston component axially displaced.
Figure 8:
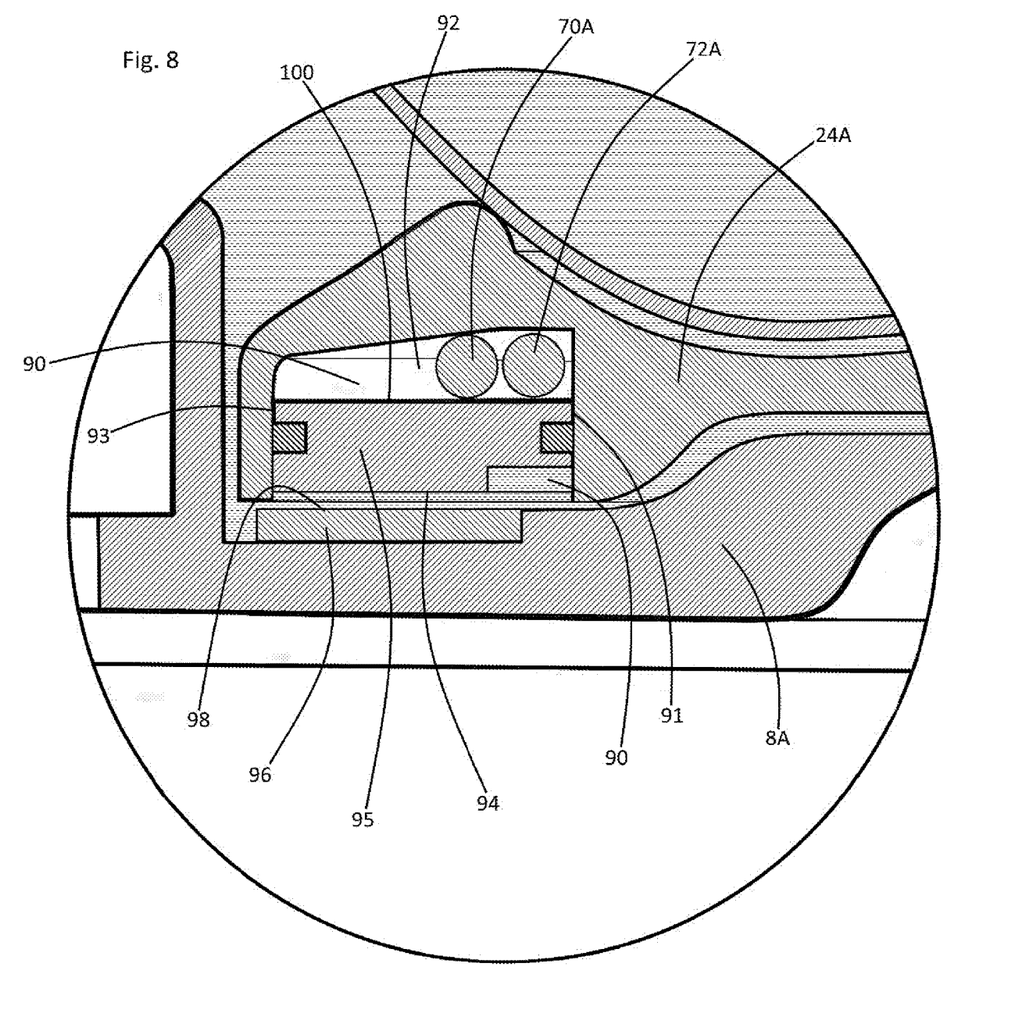
FIG. 8 presents an alternative configuration of the structure of FIG. 6.

All reference numerals appearing in Drawing FIG. 8 having the suffix "A" denote structures substantially identical to similarly numbered structures appearing in FIGS. 6 and 7. In the alternative FIG. 8 configuration, radially inner and outer walls 91 and 93 are formed as components of a modified turbine 2A. Such walls 91 and 93 form and define a piston receiving annulus 90 which alternatively extends into and opens from turbine 24A.

Figure 4:
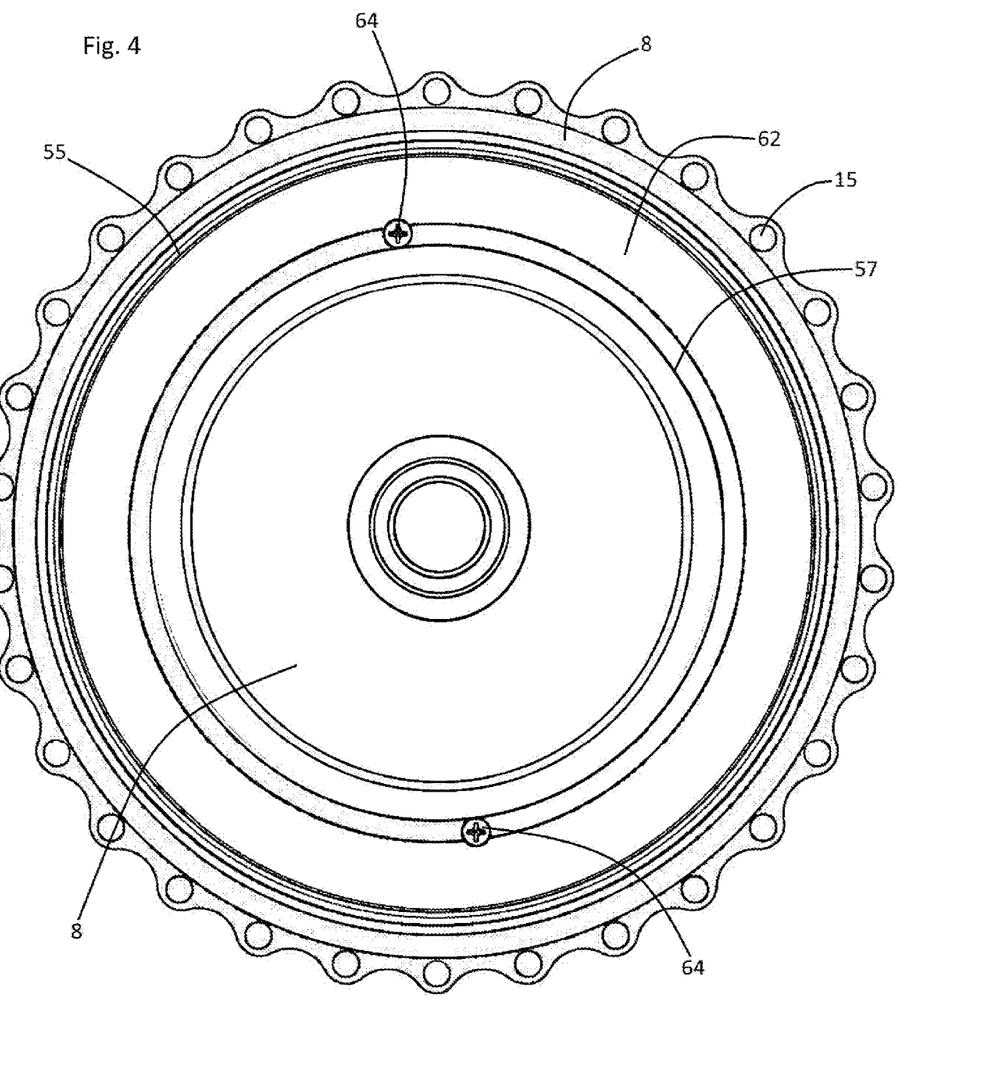
FIG. 4 redepicts the structure of FIG. 3, the view of FIG. 4 showing installation of a ring configured piston component.

A ring shaped piston 50 (or in the FIG. 8 alternative, 92) is closely fitted for sliding receipt within annulus 36 or 90, as the case may be. Annular pressure seals 56 and 54 are provided for occlusively sealing the air space beneath the piston. Referring in particular to Drawing FIG. 5, vent ports 60 are provided to allow the piston 50 to be slidably installed into the annulus 36. As shown in FIG. 4, screw plugs 64 are provided to allow the air filled space beneath the piston to be resealed following sliding installation of the piston 50 into the annulus 36. In FIG. 4, the radially outer and inner peripheries of the piston 50 are denoted by Reference Numerals 55 and 57.

Referring simultaneously to FIGS. 3, 5, and 6, a radial array of or a plurality of race and roller combinations 42, 70, and 72 are provided, such combinations being positioned at the oppositely axial end of the piston 50. The rollers 70 and 72 are preferably spherical ball bearings. Such rollers may suitably, though less desirably, be configured as cylindrical rolls. In operation of the invention's race and roller combinations 42,70,72, engine driven rotation of the case 8,10 centripetally accelerates the rollers 70 and 72, and centrifugally drives the rollers in the radially outward direction. As indicated in FIG. 7, the floor 44 of race 32 is angularly displaced at an angle "a" with respect to the oppositely-axial surface 52 of the piston 50. According to the function of such slope angle "a", the radially outward centrifugal driving of the rollers 70 and 72 causes the outermost roller 70 to work as a wedge between floor 44 and piston surface/ceiling 52. Such wedging action effectively drives the piston 50 in an axially directed piston counter-stroke from the retracted and disengaged position depicted in FIG. 6 toward the extended and frictionally engaged position depicted in FIG. 7.

In the preferred embodiment, the rollers 70 and 72 are spherical and are composed of a very hard steel material. The oppositely-axial surface 52 of the piston 50 is preferably composed of a similarly hard steel material. Such spherical and hardness characteristics of the contact surfaces helps to assure that, upon wedging engagement of the rollers 70 with the piston 50 as indicated in FIG. 7, static friction contact occurs only within a very small contact area. In conjunction with such measures for lessening static friction at the piston/roller interface, the angle "a" may be adjusted and selected to be large enough to allow the pressure of fluid within space 16 to induce sliding friction at such roller and piston interface upon a reduction of centrifugal force exerted against the rollers 70 and 72. Such roller geometry, frictional characteristics, and race floor angle adjustments may advantageously allow each axially directed clutch engaging piston counter-stroke to be countered and reversed a clutch disengaging piston stroke, such disengaging strokes being normally impelled by the ambient hydraulic fluid pressure within the case 8,10.

Figure 9:
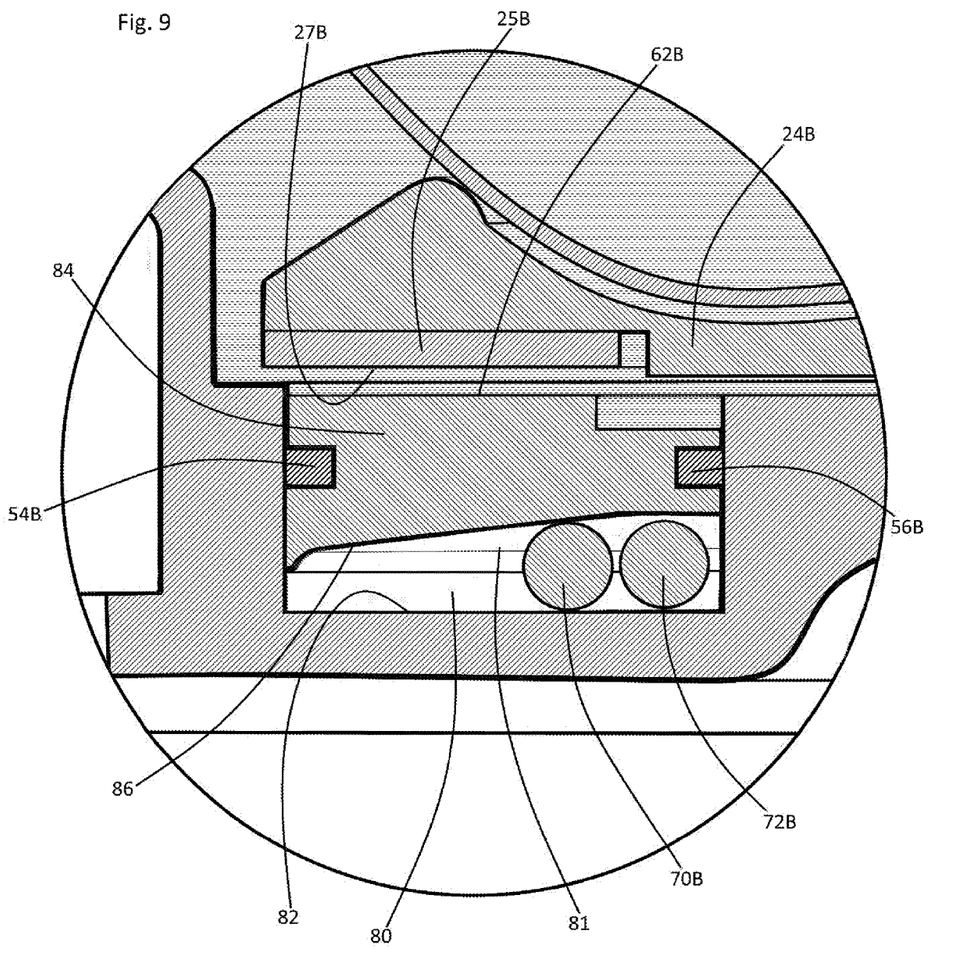
FIG. 9 presents a further alternative configuration of the structure of FIG. 6.

Viewing FIGS. 6, 7, and 9 simultaneously, all reference numerals having the suffix "B" are configured substantially identically with similarly numbered structures appearing in FIGS. 6 and 7. In the alternative configuration of FIG. 9, annulus 80 has a relatively flat oppositely-axial end or floor 82, and the radially outer chokes of races 81 are provided by sloping of the races' axial ceiling 86 which is provided by the oppositely-axial end of an alternatively configured piston 84. Further alternatively, the requisite radially outer chokes of the invention's roller and race combinations may incorporate angled slopes of both the floors and the ceilings of the races.

Referring to FIGS. 6 and 7, an annular or ring shaped friction pad 25 is mounted to the turbine 24, such pad 25 having a friction surface 27 which directly faces and overlies the axial end 62 of piston 50. In the alternative FIG. 8 configuration, ring friction pad 96 having friction face 98 similarly faces the axial surface 94 of the alternatively oriented and mounted piston 92. The FIG. 8 rollers 70A and 72A centrifugally drive into the radially outward chokes provided by the sloped floors 100 of races 92 and by the axial race ceiling provided by the oppositely-axial surface of piston 95.

Referring simultaneously to FIGS. 5, 6, and 7, it may be seen that sockets 46 open between the races 42, and rotation stopping pins or lugs 58 extend oppositely-axially from the oppositely-axial end 52 of the piston 50. Such pin 58 and socket 46 combinations dually function for guiding axial and oppositely axial reciprocating motions of the piston 58, and for assuring that upon frictional clutching contact of the piston 50 indicated in FIG. 7, the piston is constrained to co-rotate with the case 8,10 with no circumferential slippage of the piston.

In operation of the instant inventive torque converter 1, referring simultaneously to FIGS. 1-7, while the case 8,10 is at rest, hydraulic fluid pressure within volume 16 impels a normal piston stroke which moves in the piston 50 in the oppositely-axial direction. At the commencement of such fluid pressure actuated stroke, rollers 70 and 72 slidably and rollably move radially inwardly, such inward roller motion advantageously allowing oppositely-axial retraction of piston 50 away from friction surface 27.

During high powered accelerating operation of the engine, a large differential in speeds typically exists between the rotation speed of the turbine 24 and the rotation speed of the case 8,10. Such rotation speed differential prevents the case 8,10 from increasing its rotational velocity to the level at which rollers 70 and 72 commence centripetally driving the piston 50 in a counter-stroke which engages the piston with the turbine's friction surface 27. Clutch engagement during a high rotation speed differential is inappropriate, and the instant invention advantageously allows the rotation speed differential to operate to prevent premature clutch lock-up.

As the differential in rotation speeds of the case 8,10 and the turbine 24 diminishes, the rotary speed of the case 8,10 is freed to rise to that at which rollers 70 and 72 commence driving the axial end 62 of the piston 50 into frictional engagement with friction surface 27 of the turbine 24. The number and cumulative mass of the rollers 70 and 72 are preferably selected and adjusted so that frictional engagement and lock-up clutching of the torque converter occurs only after the rotational speed of the turbine 24 exceeds 75% of the rotational speed of the case 8,10.

The races 42 are preferably radially oblongated so that the centripetally acceleratable mass of rollers may be adjusted through radially balanced placements of varying numbers of rollers within the races.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A torque converter comprising:
   (a) a case having a rotation axis;
   (b) an impeller within the case, the impeller being mounted for co-rotation with the case;
   (c) a turbine within the case, the turbine being mounted for rotation with respect to the case;
   (d) radially inner and radially outer walls within the case, said walls defining an annulus having axial and oppositely-axial ends, said walls being mounted for co-rotation with the case or said walls being mounted for co-rotation with the turbine;
   (e) a piston slidably received within the annulus, the piston having axial and oppositely axial ends;
   (f) a plurality of race and roller combinations mounted at the annulus's oppositely axial end, said combinations being adapted for centrifugally driving their rollers, and for axially pressing their rollers against the piston; and
   (g) a friction surface within the case, the friction surface being positioned for, upon the axial pressings of the rollers against the piston, frictionally resisting rotation of the piston.

2. The torque converter of claim 1 wherein the races have radially outer ends, and wherein the adaptations of the race and roller combinations for axially pressing their rollers against the piston comprise axial chokes of the races' radially outer ends.

3. The torque converter of claim 2 wherein the piston and annulus have radially inner and radially outer ends, and further comprising radially inner and radially outer pressure seals respectively positioned at said ends.

4. The torque converter of claim 3 wherein the radially inner and outer pressure seals hermetically seal a body of gas within the annulus, and further comprising a gas relief port opening the annulus.

5. The torque converter of claim 4 wherein the gas relief port extends axially through the piston.

6. The torque converter of claim 5 wherein the gas relief port opens at the piston's axial end, and further comprising a removable plug connected operatively to the piston at said relief port opening.

7. The torque converter of claim 2 wherein the friction surface co-rotates with the turbine.

8. The torque converter of claim 7 wherein the turbine is positioned axially from the piston and has an annular oppositely-axial face, said face comprising the friction surface.

9. The torque converter of claim 8 wherein the rollers comprise spheres.

10. The toque converter of claim 9 wherein each race is radially oblongated.

11. The torque converter of claim 10 wherein each race has a radially outer end having an axial dimension, wherein said each race has a radially inner end having an axial dimension, and wherein said each race's radially inner end axial dimension is greater than that of said each race's radially outer end axial dimension.

12. The torque converter of claim 11 wherein the annulus has an axially sloped floor, and wherein the axial choke of each race's radially outer end comprises the axially sloped floor.

13. The torque converter of claim 12 further comprising a plurality of rotation stopping pin and socket combinations, said combinations operatively spanning between the piston and the annulus's floor.

\* \* \* \* \*